May 19, 1970    J. UERLICHS ET AL    3,512,752
SHUTOFF VALVE FOR PIPELINES
Filed Feb. 12, 1968
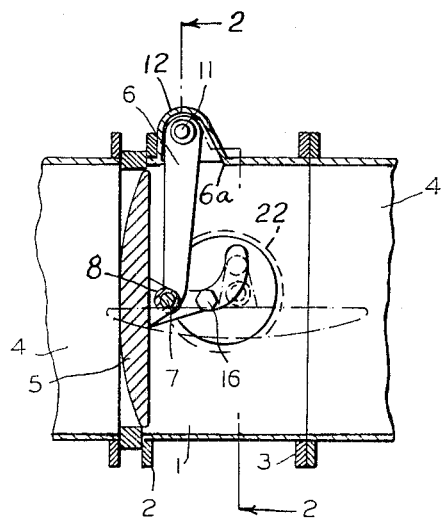
FIG.1
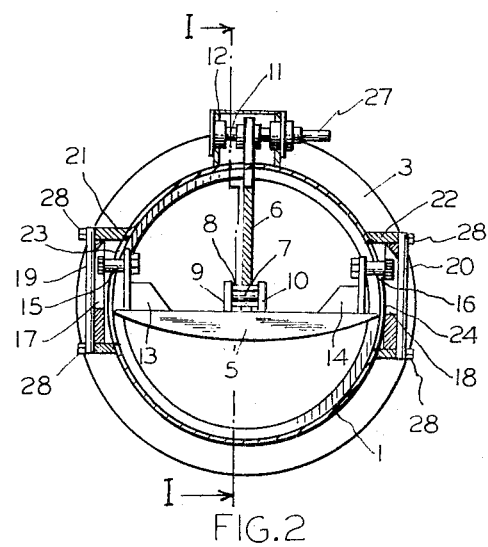
FIG.2
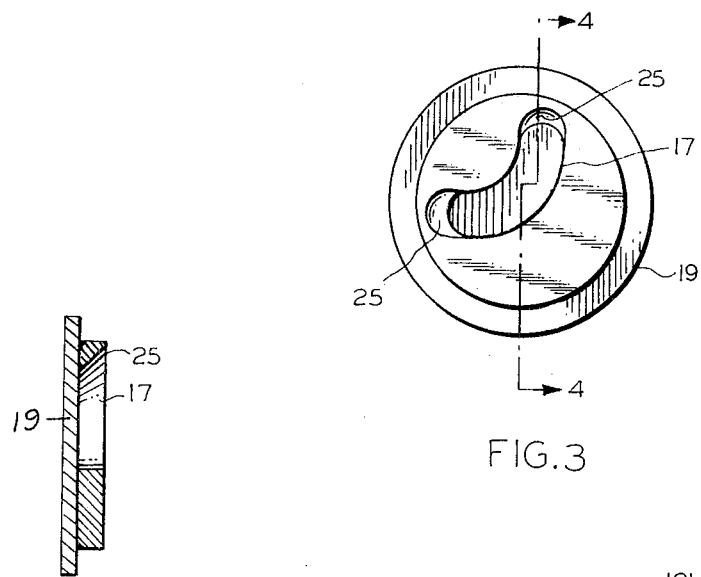
FIG.3
FIG.4
INVENTORS
JOHANNES UERLICHS
RUDOLF MULLER
PETER KEUTGEN
BY *Wenderoth, Lind & Ponack*
ATTORNEYS 3,512,752
SHUTOFF VALVE FOR PIPELINES
Johannes Uerlichs, Duren-Birkesdorf, Rudolf Muller, Merzenich, and Peter Keutgen, Drove, Germany, assignors to Hermann Rappold & Co. GmbH., Duren-Birkesdorf, Germany
Filed Feb. 12, 1968, Ser. No. 704,778
Claims priority, application Germany, Feb. 16, 1967, R 45,294
Int. Cl. F16k 1/22
U.S. Cl. 251—308                    2 Claims

ABSTRACT OF THE DISCLOSURE

A valve assembly including a valve casing for mounting in line with pipe lines of large diameter wherein the valve disk is first moved for a slight axial distance perpendicular to its seat and then moved arcuately and at right angles thereto for positioning the valve disk parallel to the flow of media passing through the pipe line. This movement of the valve disk is accomplished by means upon the valve disk including guide bolts or pivot pins projecting from opposite sides of an offset from the valve disk and cooperating with guide cams located at opposed openings in the pipe line casing and outwardly adjacent of the casing so that access may easily be made via removable covers carrying said guide cams from the exterior of the pipe line to the interior thereof for maintenance purposes. A single slender actuating lever with one end attached pivotally and centrally to said valve disk and offset from but closer thereto than said guide bolts, and with the other end of the lever projecting exteriorly of the casing, is utilized to effect a balanced and less obtrusive opening and closing of said valve disk.

---

This invention relates to a shutoff valve especially for pipelines of large diameter, having a valve disk suspended swingable within the valve casing from an actuation lever extending towards the outside, said valve disk during the opening process being lifted at first vertically from its seat by guides partially arranged at the disk and partially at the casing and then turned. It is an object of the invention to arrange the guides which determine the direction of movement and the turning of the valve disk at least partially outside of the space in which the disk moves in order to increase the durability of the guiding elements, to make them accessible from the outside and to keep the cross section of the casing as free as possible for the medium flowing through.

In known shutoff valves the disks of which are either actuated via a lever system or a shaft, the guiding means in the form of guide rods or rocker arms which place the valve disk onto the sealing seat or remove the same from it and which actuate the turning of the disk into the locking or open position are arranged within the space of the valve casing. This is especially disadvantageous during the passage of media which contain dust or other particles of solid material, for instance furnace blast, since the particles of solid material have the effect of wear and tear beyond a normal wear on the guide means fully subjected to the flow of gas. Because of this and because of the accummulation of soiling within the range of the movable elements of the guide means after a short time of operation usually maintenance work on the shutoff valve becomes necessary, which for this purpose has to be separated from the pipeline since the parts which are subject to wear and tear are not accessible from the outside. It is an object of the invention to avoid these disadvantages.

A further object of the invention is to provide essentially parallel to the axis of the pivot joint between an actuation lever and the valve disk at the peripheral edge of the disk, guide means which cooperate with guide means on the valve casing arranged outside of the space in which the disk rotates. On account of such an arrangement the danger of premature wear and soiling of the guiding valve parts is essentially diminished and in addition to that, because of a corresponding form of the dome-shaped casings surrounding the openings for the guide means a direct access to the interior is obtained to the elements of the valve so that damage can be repaired easily.

A further object is to provide guide means for the valve disk provided with guide bolts which engage with guide cams fastened to the outer casing wall and the guide cams are advantageously arranged on covers which close a socket arranged around the openings for the guide means in the valve casing. In this way the guides are especially easily accessible and besides, the valve may be adapted to new regulating conditions in a simple way by the provision of covers with other guide cams.

With the above and other objects in view which will become apparent from the detailed description below, a preferred embodiment of the invention is shown in the drawings in which:

FIG. 1 is a longitudinal cross-section of fragmentary pipe sections interjoined by a valve housing and showing the valve member in elevation and in closed or locking position.

FIG. 2 is a cross-sectional view taken substantially upon section line 2—2 of FIG. 1 but with the valve disk in open position.

FIG. 3 is a plan view of one of the covers having a guide cam, and

FIG. 4 is a cross-sectional view taken upon section line 4—4 of FIG. 3.

In the drawings, the valve casing 1 is provided with annular flanges 2 and 3 for fastening together sections 4 of the pipe lines and has a valve member preferably in the form of disk 5 pivotally mounted on a relatively thin operating lever 6 extending outside the casing 1. For attaching the valve disk on the lever 6 a pivot pin 7 is provided which connects a journal 8 provided at the lower end of the lever 6, with the spaced fishplates 9 and 10 arranged at the center of the planar side of the valve disk. The outermost end of the lever 6, exteriorly of the valve casing, is fastened to a shaft 11 which is pivotally mounted parallel to pin 7 within a headpiece 12 on the valve casing 1 surrounding the lever opening 6a. Shaft 11 has one end 27 extending to the exterior of the headpiece 12. The motive power for the valve actuation is initiated via the shaft 11 which may be accomplished manually, mechanically or hydraulically by suitable means (not shown) connected with shaft 11.

In the direction of the axis of the pivot pin 7, and on the planar surface of and adjacent the peripheral edge of the disk on both sides of the pivot bearing of the pin 7, brackets 13 and 14 are arranged with detachable pivot or guide bolts 15 and 16. Said bolts 15, 16 extend slightly beyond opposite edges of the disk in parallel with the axis of pivot pin 7, and have end portions which extend through openings in the casing 1 into guide cams 17 and 18 provided in the covers 19 and 20. Said covers are removably attached to the casing head pieces 21 and 22 which surround the opposed guide bolt openings 23 and 24, said head pieces being affixed to the exterior of the casing 1.

Guide cams 17 and 18 are provided with arcuate camways or guiding sections which extend both in the direction of the axis of flow through the valve casing 1 and also transverse to the axis of flow. Accordingly, when the disk actuating lever 6 is moved to adjust the valve disk 5 from the closed or locking position, as illustrated in solid lines in FIG. 1 to the open position as shown in dash-dot outline in FIG. 1 and in solid in FIG. 2, the disk first moves parallel away from the sealing position to a sufficient distance from the sealing seat so that the disk-attached guide bolts 15 and 16 responsive to the action of said disk around pivot pin 7 move into the sections of cams 17 and 18 which are vertical to the axis of flow, until the plane surface of the disk 5 is parallel to the direction of flow as shown in dot and dash lines in FIG. 1.

As seen in FIG. 2, the covers 19 and 20 are provided with the arcuate guide cams or camways 17 and 18 and these may be changed or replaced in a simple way by the removal of clamping bolts such as 28. Simultaneously with the removal of the covers 19 and 20 the interior of the casing is accessible so that operating troubles may be easily dealt with. In order to avoid impurities from accummulating in the ends of the arcuate camways 17 and 18 they are provided with advantageously beveled edges 25.

We claim:

1. A shutoff valve assembly for a pipeline having a swingable valve member suspended therein with the plane thereof at right angles to the axial flow, which valve first lifts axially from its valve seat for initial opening thereof, and then arcuately and pivotally rotates to a fully opened position with the plane thereof generally parallel to the axial flow, said valve assembly comprising in combination:

(a) a tubular valve casing having a valve opening and circumferential valve seat whose plane is disposed at right angles to an axial directed flow in said line, and having a pair of enlarged access openings at opposite sides of said casing offset from the plane of said valve seat;

(b) a swingable, generally planar valve member within said casing and having opposed faces, one of which engages with said valve seat, and with pivotal mounting means on the opposite face at and connecting opposite medial side edges thereof to said valve casing;

(c) said mounting means including a pair of aligned oppositely extended pivot bolts offset from the plane of said valve member, and each of said bolts having the far opposite ends projecting through said access openings exteriorly of said casing;

(d) cover means including removable cover plates demountable from the exterior of said casing, and for covering said oppositely disposed casing access openings;

(e) said cover means including a pair of bolt guides each having arcuate camways to receive said opposite bolt ends therein, and the cover means with said guides are attached to opposite exterior sides of said valve casing outwardly adjacent each of said casing access openings;

(f) said cover means further including removable fastener means cooperable with said cover plates and casing to removably attach said cover plates to said casing with said camway bolt-guides interposed therebetween;

(g) an elongated valve-actuating link of thin cross-section indirectly pivotally attached at one end and offset relative to the plane of the valve member at the center portion thereof between said pivot bolts, and the other end projecting exteriorly of the casing through a covered actuating slot in said casing, which outer end is to be connected with suitable operating means to effect opening and closing valve movements; and (h) said center-connected actuating link connected to said valve member by pivot means whose axis is parallel to the axis of said pivot bolts, but offset a distance from said valve member different than that of said pivot bolts.

2. A valve assembly as defined in claim 1 further including casing head pieces surrounding said access openings of and connected to said casing, and to which said cover means is attached; said guide camways of paragraph (e) being beveled in a transverse direction at the opposite ends thereof to preclude build-up therein of debris from material conveyed through said pipeline, which debris build-up would tend to adversely effect valve operation; and wherein the axis of said pivot means of paragraph (g) connecting said actuating link centrally to said valve member is offset a lesser distance from said valve member than the axis of said pivot bolts.

References Cited

UNITED STATES PATENTS

| | | | |
|---|---|---|---|
| 850,215 | 4/1907 | Dornfeld | 251—228 XR |
| 1,595,038 | 8/1926 | Venel | 251—158 |

FOREIGN PATENTS

| | | |
|---|---|---|
| 1,325,052 | 3/1963 | France. |
| 405,439 | 2/1934 | Great Britain. |

HAROLD W. WEAKLEY, Primary Examiner

U.S. Cl. X.R.

251—367